United States Patent [19]

Bosserman et al.

[11] 4,026,641
[45] May 31, 1977

[54] TORIC REFLECTOR DISPLAY

[75] Inventors: David A. Bosserman, Alexandria; Charles F. Freeman, Springfield, both of Va.

[73] Assignee: The United States of America as represented by the Secretary of the Army, Washington, D.C.

[22] Filed: Dec. 30, 1975

[21] Appl. No.: 645,501

[52] U.S. Cl. .............................. 350/298; 350/174; 350/293
[51] Int. Cl.² .......................................... G02B 5/10
[58] Field of Search .......... 350/174, 290, 291, 293, 350/296, 298, 191, 301, 302

[56] References Cited

UNITED STATES PATENTS 3,697,154  10/1972  Johnson ............................ 350/174

FOREIGN PATENTS OR APPLICATIONS 1,282,425  7/1972  United Kingdom ............... 350/174

*Primary Examiner*—F. L. Evans
*Attorney, Agent, or Firm*—Nathan Edelberg; Max L. Harwell; Robert P. Gibson

[57] ABSTRACT

A toric reflector display comprising a toric concave reflector with a toric convex object surface, an auxiliary display device, and an optical transfer device which transfers information from the auxiliary display to the toric object surface. The toric reflector display provides an observer with a distant virtual image of the information. The virtual image of the information may be viewed superimposed on the real world if the toric concave reflector is semi-opaque.

10 Claims, 3 Drawing Figures

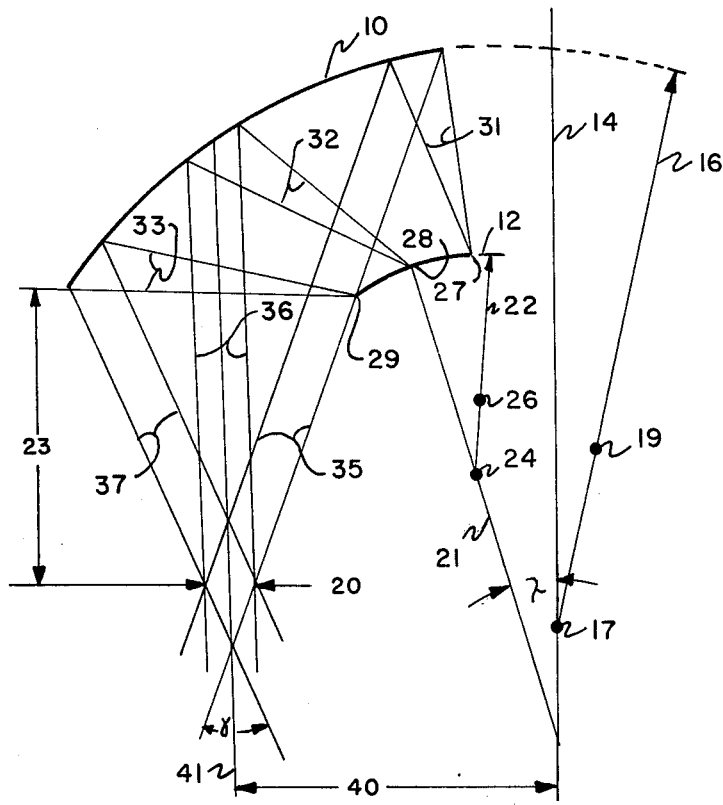
FIG. 1
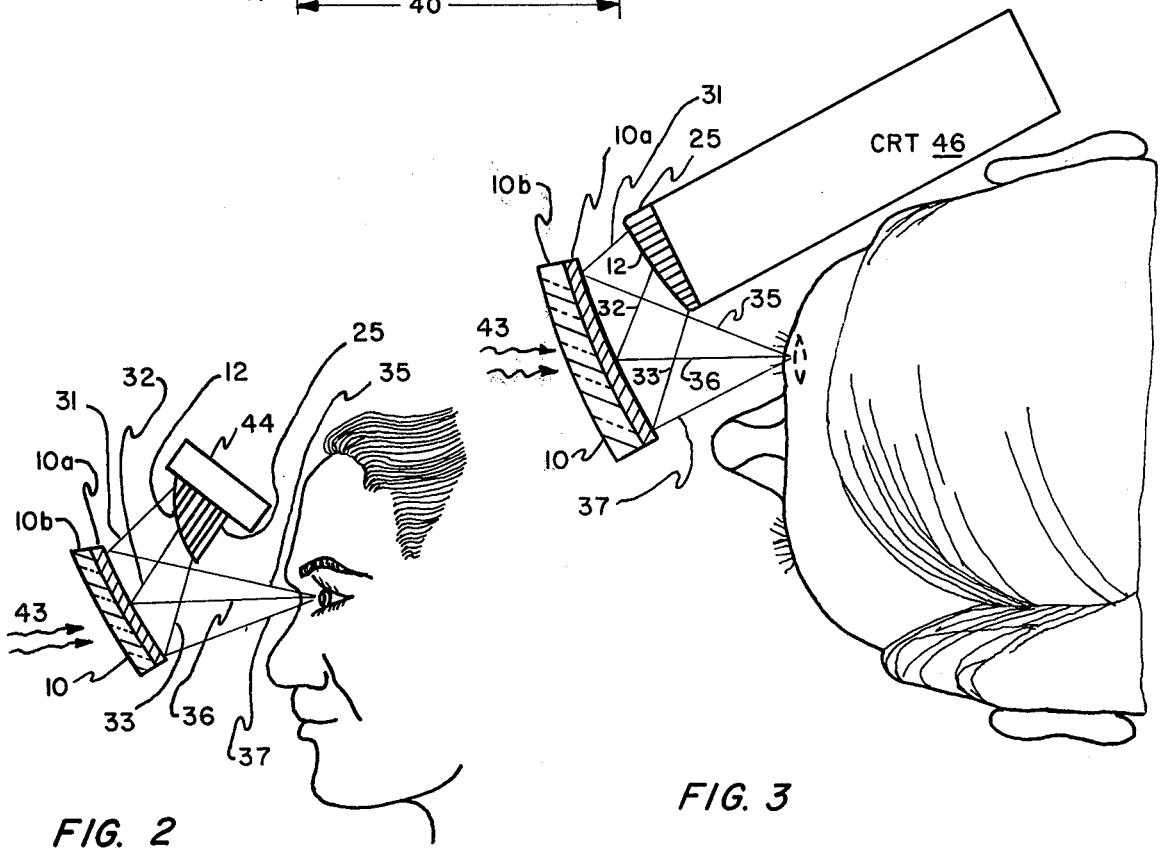
FIG. 2
FIG. 3

TORIC REFLECTOR DISPLAY

The invention described herein may be manufactured, used, and licensed by or for the Government for governmental purposes without the payment of any royalty thereon.

BACKGROUND OF THE INVENTION

The toric reflector display was invented to reduce the size, mass and profile of wide field of view helmet mounted displays but is not limited in its use to being helmet mounted.

SUMMARY OF THE INVENTION

This invention relates to a display system which provides a wide field of view distant virtual image to an observer. This invention further comprises a head or helmet mountable display, the active elements of which are a concave toric reflector with a convex toric object surface, an auxiliary display device, and an optical transfer device which transfers information from the auxiliary display device to the toric object surface. The reflector may have a metallic or a multilayer interference film on the front or rear surface. The reflector may be totally reflecting, partially reflecting and partially transmitting, or it may reflect and transmit chosen wavelengths of light. The optical transfer device may be an optical system or a fiber optic plate which has the convex toric object surface on the output side thereof while interfacing with the auxiliary display device on the other side. The auxiliary display device may be an optical system, transparency or film, alpha-numeric display or video monitor.

BRIEF DESCRIPTION OF DRAWINGS

FIG. 1 is an optical schematic of the toric reflector with the toric object surface;

FIG. 2 shows a partial view of a toric reflector display interfaced in a top mounted mode with an observer;

FIG. 3 shows a partial view of a toric reflector display interfaced in a side mounted mode with an observer.

DETAILED DESCRIPTION

Looking at FIG. 1, this invention is a toric reflector display comprising a concave toric reflector 10 with a convex toric object surface 12, an auxiliary display device (not shown), and an optical transfer device (not shown) between the object surace and the auxiliary display device. The reflecting surface of the reflector is an off-aperture section of a toric reflector and subtends the display field of view. The object surface 12 approximates the focal surface of the toric reflector 10. The optical transfer device transfers information from the auxiliary display device to the object surfaces. The auxiliary display device may be any suitable transparency, film, optical system, alpha-numeric display or video monitor.

FIG. 1 is an optical schematic cross-section of the toric reflector display. The reflector 10 surface is an off-aperture section of a toric with axis 14, long radius of curvature 16 centered at point 17 and short radius of curvature (not shown) but centered at point 19 and rotating in the plane perpendicular to the paper which contains the long radius of curvature 16. The object surface 12 is a section of a toric with axis 21, long radius of curvature 22 centered at point 24 and short radius of curvature (not shown) but centered at point 26 and rotating in the plane perpendicular to the paper which contains the long radius of curvature 22.

Points of light representing information coming from object surface 12, which represent display information from an auxiliary display device is collimated by the concave toric reflector 10. Shown are object points 27, 28, and 29 from which diverging beams 31, 32 and 33 are collimated into parallel beams 35, 36 and 37 which fill the exit pupil 20 at the eye relief 23 from the edge of reflector 10. The eye when positioned within the exit pupil 20 would see the object points 27, 28 and 29 on object surface 12 as distant points of light. Also, any information such as symbology or some scene which appears on the object surface 12 from an auxiliary display device as discussed hereinbelow would appear to originate at some distance in the observer's forward visual space. The distance 40 between the visual axis 41 and the axis of reflector 14 is the off-aperture distance and should be kept as small as possible to reduce optical aberrations. If the collimated bundles 35 and 37 are the edge bundles from reflector 10 then $\gamma$, which is the angle between 35 and 37, is the angular field of view in the plane of the drawing. The angular field of view perpendicular to the paper, designated as $\gamma'$, cannot be shown but is referred to hereinbelow.

For a given set of conditions, such as head and/or head gear clearances, a desired exit pupil 20, eye relief 23, and field of view angles $\gamma$ and $\gamma'$, the design variables may be manipulated to yeild an acceptable image. These design variables include the two convex toric object surface 12 radii of curvature the two concave toric reflector 10 radii of curvature and the relative position of the two surfaces of 10 and 12 including the angular displacement of their axes 14 and 21. Additional degrees of design freedom can be obtained by having aspheric deviations in the two radii of curvature of 10 and in the two radii of curvature of 12 as functions of angular position, or by employing a mangin or rear surface reflector. The mangin reflector may be made of more than one optical element.

FIG. 2 shows a cross-section of one embodiment of the toric reflector display of the present invention. This toric reflector display has a front surface concave toric reflector 10 comprised of a glass substrate 10$b$ having a thin metal film 10$a$ in the front concave portion thereof for front surface reflection. An auxiliary display device 44, which is preferably a miniature flat panel display, has an optical transfer device 25, for example a fiber optic plate, interfaced with the output face thereof. The optical transfer device 25 has the convex toric object surface 12 on the side opposite the output face of device 24. FIG. 2 shows the top mounted configuration with respect to the observer's head.

FIG. 3 shows a cross-section of another embodiment of a toric reflector display with the same concave toric reflector 10 as in FIG. 2, but this time the auxiliary display device 46 is a minature cathode ray tube (CRT) mounted in a side of the head configuration. The toric reflector display may be head mounted to suitable head gear by suitable attachments and adjustments (not shown). Even though the concave toric reflector 10 is shown as a thin metal film 10$a$ mounted on the front concave portion of a glass substrate 10$b$, the reflector may have an opaque or semiopaque front or rear Mangin metallic reflecting surface on a suitable substrate. The metallic reflecting surface could also be replaced with a multilayer interference film.

If the toric reflector 10 is not totally opaque to all the visible spectrum, the observer can see through it to view real world objects in the visual space of interest provided that the imaged information and real world objects are at commensurate viewing distances. The displayed information will be seen superimposed upon the real world object space. Arrows 43 represent rays from a distant object representing the real world objects in both FIGS. 2 and 3.

The optical transfer devices 25 which form the object surfaces 12 and interface with the auxiliary display devices 44 and 46 respectively in FIGS. 2 and 3 may be integral to or separate from the auxiliary display devices 44 and 46. If device 25 is a fiber optic plate, the fibers may be on a bias to the auxiliary display device in order to better match the output numerical aperture of the fibers to the acceptance cone of the concave toric reflector 10.

The toric reflector display may be used with either or both eyes. Even though only two configurations and a broad embodiment of the toric reflector display are shown, other modifications may be made to various forms of the invention described herein without departing from the spirit and scope of the appended claims.

We claim:

1. A head gear mounted toric reflector display system which forms a wide field of view virtual image in the visual space of an observer, said display system comprising:
   a concave toric reflector in said visual space of an observer, said concave toric reflector having a reflecting surface that is an off-aperture section of a toric reflector having one long radius of curvature and one short radius of curvature for subtending said wide field of view virtual image;
   an auxiliary display device which provides information to be viewed by said observer;
   a concave toric object surface facing said concave toric reflector and which approximates said reflecting surface of said concave toric relector; and
   an optical transfer device which transfers information from said auxiliary display device to said convex toric object surface as object points of information wherein light from said object points travels directly to said concave toric reflector as diverging beams and are collimated by said concave toric reflector into parallel beams which fill the exit eye pupil of said observer.

2. A display system as set forth in claim 1 wherein said optical transfer device is a fiber optic plate.

3. A display system as set forth in claim 1 wherein said concave toric reflector is a front surface reflector.

4. A display system as set forth in claim 1 wherein said concave toric reflector is a Mangin reflector.

5. A display system as set forth in claim 1 wherein said toric reflector has an opaque metallic reflecting surface.

6. A display system as set forth in claim 1 wherein said toric reflector has a semiopaque metallic reflecting surface.

7. A display system as set forth in claim 1 wherein said toric reflector has a multilayer interference film on the reflecting surface.

8. A display system as set forth in claim 1 wherein any of the two radii of curvature of said concave toric reflector and the two radii of curvature of said toric object surface have aspheric deviations.

9. A display system as set forth in claim 1 wherein said optical transfer device is the output face of said auxiliary display device.

10. A display system as set forth in claim 1 wherein said optical transfer device is a fiber optic plate having an input which conforms to said auxiliary display device requirements and an output which forms said convex toric object surface.

* * * * *